United States Patent [19]

Cahill

[11] Patent Number: 4,566,042

[45] Date of Patent: Jan. 21, 1986

[54] ELECTROPHOTOGRAPHIC IMAGING APPARATUS BY VARIABLY PLACING PIXEL ELEMENTS

[75] Inventor: Lysle D. Cahill, Dayton, Ohio

[73] Assignee: Coulter Systems Corporation, Bedford, Mass.

[21] Appl. No.: 637,512

[22] Filed: Aug. 3, 1984

Related U.S. Application Data

[62] Division of Ser. No. 11,320, Feb. 13, 1979, Pat. No. 4,468,706.

[51] Int. Cl.[4] .............................................. H04N 1/30
[52] U.S. Cl. .................................... 358/300; 358/283; 358/298
[58] Field of Search ............... 358/280, 283, 296, 298, 358/300, 302; 346/108, 160

[56] References Cited

U.S. PATENT DOCUMENTS 3,725,574  4/1973  Gast .................................... 358/298

Primary Examiner—E. A. Goldberg
Assistant Examiner—Fred L. Kampe
Attorney, Agent, or Firm—Silverman, Cass & Singer, Ltd.

[57] ABSTRACT

A digital laser platemaker for imaging an electrophotographic member by electrostatic techniques using information which is derived from a source of binary data. The binary data may be achieved by scanning a pattern or may be synthesized electrically to represent that which it is desired to reproduce on the electrophotographic member. The binary data is applied to a pixel generator which is constructed and arranged to produce an output in the form of signals for driving an acousto-optical deflector that in turn deflects a laser beam to form a composite of rays. The composite of rays represent the columns of a pattern to be applied to each pixel which is generated, the rows of the pixel being represented by the output of a shaft encoder that is synchronized with the rotation of a cylinder carrying the electrophotographic member. The pixel generator produces hexagonal pixels and the pattern in each pixel represents density information derived from the binary data originally received by the pixel generator. The patterns in the pixels are arranged to prevent undesirable moire effects. The electrophotographic member receives the composite rays from a carriage which moves in synchronism with the rotation of the cylinder and the rate at which the composite rays are applied. The resulting latent image is toned and fused on the cylinder. Thereafter it may be used as the printing plate after certain processing.

41 Claims, 7 Drawing Figures

ELECTROPHOTOGRAPHIC IMAGING APPARATUS BY VARIABLY PLACING PIXEL ELEMENTS

This application is a division of application Ser. No. 011,320, filed Feb. 13, 1979 now U.S. Pat. No. 4,468,700.

CROSS REFERENCE TO RELATED APPLICATION AND PATENT

Reference is made hereinafter to U.S. Pat. Nos. 4,427,999, 4,428,000, and 4,467,707 and entitled HIGH SPEED IMAGING OF ELECTROPHOTOGRAPHIC FILM BY FINE BEAM SCANNING, the applicants being Manfred R. Kuehnle and Lysle D. Cahill.

Reference is also made herein to a U.S. Pat. No. 4,025,339 issued on May 24, 1977 to Manfred R. Kuehnle.

Both the application and the patent above identified are owned by the assignee of the application herein.

FIELD AND BACKGROUND OF THE INVENTION

The field of the invention comprises apparatus and a method for imaging electrophotographic members by means of radiant energy devices such as lasers, the imaged electrophotographic members being thereafter used primarily for printing. In the case of lithographic offset printing the actual imaged member itself is treated to render toned and untoned parts hydrophobic and hydrophilic, respectively and the member comprises the printing plate without further processing. In other cases the toned electrophotographic member may be used as an information source by reading the images or projecting them if transparent or photographically reproducing them if desired. The preferred use of the invention is to make the printing plates either on transparent synthetic resin sheeting such as polyester or upon metal such as tin plated steel. Each of these substrates is coated with a type of photoconductive coating which will be described below.

In the printing industry, pictures, photographs and other images are usually reproduced by utilization of what has become known as half tone printing. In this process the original image or pattern of graphic material is photographed through a screen of crossed parallel and perpendicular lines to form an array of dots on the photographic film. Each dot in this array has a size and a spacing relative to the other dots which are produced which relates or is attempted to be related to the density of a corresponding incremental area in the original image which is being reproduced. Black and white graphics are photographed through the screen once while color graphics are photographed several times, once for each color which is to be printed. Each of the latter photographs is taken through the same screen using different color filters to separate the original image into its primary colors.

Using other photographic processes, these arrays of spaced dots are then transferred to metal surfaces to form the printing plates which will be installed in the printing press which is to reproduce the original pattern. The printing plates are required to print the respective colored images in precise registration on the receptor which is normally a web of paper and hence there will be as many impressions on a given area of the paper as there are color plates. The composite of these arrays of dots will produce a resultant array of dots many of which will overlie one another to give a color mixture attempting to reproduce the color of the originally photographed image as closely as possible.

If the screen through which the image has been photographed is sufficiently fine the human eye will not readily perceive the individual dots but instead will integrate the resulting array into shades of different density that simulate very closely the original image. An image which is a photograph, for example, is called a continuous tone image because there are no dots visible except to an extremely high power microscope and then what one sees are the grains of silver which are deposited side by side and without spaces normally present between them. A continuous tone image cannot be made into a printing plate because the ink will run and smear due to capillary action between side by side increments destroying the visual In the case of black and white the use of half tone printing provides arrays of dots which give varying shades of gray between white where there are no dots and black where the dots are so close together and so large that they carry heavy coatings of ink in the press. In the case of color printing, the multiple impressions are required not only to provide the different shades of light and dark for information content but also to provide the multiple hues of color that are needed to attempt to reproduce the original continuous tone image.

The process of making printing plates of this type in accordance with conventional manual methods is labor intensive, time consuming and expensive. It requires considerable skill and much capital equipment for any large quantities of such plates as in the printing of periodicals, magazines, books and other largely circulated printed matter.

The process of making plates using the same techniques as have conventionally been utilized, that is, making the color separations and deriving the metal printing plates therefrom has been effected electronically in recent times. Photosensors are utilized to sense the intensity or density of incremental elements of a continuous tone image and then digital data are produced which are intended to represent the various densities of the so-called picture elements of the original image. This digital data is then used to reproduce the image as an array of dots on a printing plate with heat or light sensitive systems. These systems usually utilize laser beams to expose a master image on heat or light sensitive film or paper. The exposed film or paper is then processed to form the image on the printing plates. While these systems are not as labor intensive as the manual processes which have been mentioned above, they are nevertheless considerably more expensive than the process of the invention which will be described and they have other disadvantages.

The materials upon which such images are formed must be exposed or activated with a certain amount of radiant energy on an elemental area over a discrete period of time so as to form the image but not to burn through the material. This poses considerable problems. Imaging in this way may not be as time consuming as manual production of plates but is not rapid enough to perform either high speed or on-line imaging. Accordingly it is not utilized to any great extent for the manufacture of printing plates.

Another problem occurs when colors are overprinted by the use of the half-tone process. Printing several colors such as the primary colors to form the desired hues produces undesirable moire interference patterns. Moire patterns are produced when printed impressions from multiple screens having different numbers of lines per unit length are overlaid one on the other. Such patterns are also produced when printed impressions from screens having the same number of lines per unit length are overlaid slightly out of registration. These patterns are readily seen by the human eye as waves of light and dark lines in the printed image. In half tone processing the screen of lines through which the image is photographed reproduces the screen pattern in the printed image and also produces the moire pattern in the eventual printed image.

Moire patterns are not acceptable in quality printing and, in any kind of printing are annoying to the viewer besides distorting the reproduction of color.

The most common solution for this problem in manual half tone processing is to photograph each color separation with the screen lines arranged at a different angle relative to that of all other separations. Printing from the plates made with these separations then lays down the color patterns for the respective screens at the different angles chosen. Using this technique, the color separation is photographed and subsequently printed with the vertical lines of the screen arranged at an angle relative to a base line which coincides with or is parallel to the horizontally extending axis of the composite image to be printed. This is usually parallel to a horizontal edge of the paper or other stock which will carry the impression.

The colors of the composite image will comprise magenta, cyan, yellow and usually black in addition for enhancement. The angles which are conventionally used for printing these colors are, 90° for the yellow, 75° for magneta, 105° for cyan and 45° for black if it is used.

The solution of arrangement of the color separation screens at different angles is not a complete one because the eye will in many cases still be able to detect moire patterns. In addition, the technique results in the formation of small rosettes which can detract from the quality of a color image and can be quite annoying when they occur at critical locations on a given object.

When high quality printing is done as many as 18 different color separations may be used. Each color separation will have its own array of dots and will be processed to print at a different angle. Great care must be exercised to arrange the printing angles to reduce moire patterns and in addition the dot spacing must be chosen so that dot overlay is reduced. This is true when many impressions are to be made to achieve a particular color and is even more important where the inks tend to be opaque.

Electronic systems produce the color separations by sensing the original image through colored filters. The sensed picture elements are then digitized for use in forming the dot arrays. The sensed densities of the picture elements in each color separation are usually treated as steps of a gray scale, this scale extending from the least dense to the greatest. Each step of the gray scale is then used to form a particular pattern of printing dots on the printing plate. Each pattern of dots is equivalent in area density to the sensed intensity of a corresponding picture element of the original image. When the dot pattern is printed, theoretically an equivalent density of ink of each color then is transferred to the receptor or paper stock.

It should be noted that the dots formed in making the manual and electronic half-tone color separations are different. The dots formed in the manual process vary in surface area and spacing from the surrounding dots to produce the varying densities or shades of gray. Thus a light gray or weak density image is represented by small dots spaced a great distance from the surrounding dots. A dark gray or strong intensity image is represented by large dots, almost or actually touching each other. The dots formed electronically are generally fixed in size and spacing. Their size is usually determined by the material used and may be equal in size to the smallest dot formed in the manual process. The varying intensities are formed or represented by the number of dots in a matrix of unit area. Thus a light gray image is represented by a small number of dots in each matrix or in one of several matrices. A dark gray image is represented by a large number of dots in a single matrix.

Moire patterns are also produced when printing from color separations which have been produced electronically. This occurs because of the regular formation of dots in each matrix, and the regular formation of the matrices relative to one another to form the image. Usually the dots of each matrix are formed in particular locations which are horizontally and vertically aligned. Each matrix is located so that its dots are in alignment with the dots of the preceeding and succeeding pixel. Even though the dots which form the image are integrated by the human eye, the alignment or registration of the dots becomes apparent in the form of moire interference patterns and/or rosettes.

The present invention eliminates these moire and rosette patterns by producing color separation plates which have irregular and varying patterns of printing elements to correspond to each step of the gray scale or hue of color to be printed. The elements of each imaged pixel which are intended to pick up ink are located so that they interleave and substantially overlap each other. Imaged pixels themselves are also located so that they interleave thereby avoiding possibility of vertical or horizontal alignment of printed elements.

The first step of the gray scale following pure white, which is represented by no printing elements in a pixel, is achieved by laying down a single printing element within the given pixel at any one of a plurality of different locations. This printing element is the result of removing from the pixel all other elements rather than actively putting an element in place in the pixel. Thus, if the pixel is designed to carry 19 elements; the process and apparatus remove 18 of the elements. Consider that the process of the invention is effected electrostatically and the pixel is formed by exposing a previously charged area on a photoconductive coating, if the presence of 19 rays of radiant energy directed at the pixel area will discharge the entire area leaving no charge at all, then the presence of 18 rays of radiant energy will discharge all but one element and that element will be tonable and can become a printing element. As seen hereinafter, the exposure of the pixel area does not require eighteen rays of radiant energy impinging at one time to expose eighteen incremental elements, but the principle should be understood that a printing element is produced by nondischarge of a charge from the photoconductive coating, the discharge of elements being effective to produce nonprinting increments of the pixel.

Further steps of the gray scale are achieved by forming additional printing elements in the pixel, these elements as a rule being adjacent and overlapped so that there is a single integral printing element in each pixel which will produce a printed formation that represents a particular density. Although it is easier to provide the single formation made up of several nondischarged areas within the pixel that are contiguous, it is feasible under certain circumstances to divide the nondischarged elements or areas into several, for example two, and achieve a subtle density step in the gray scale. In the formation of printing elements within the pixels, any one of a number of positions will be effected so that the changes of moire patterns forming become very low.

The use of a number of different patterns for the placement of the printing formations produced in each pixel ensures that the irregularity of the elements and the pixels will approach an almost random placement of the dots forming the printed result. The use of the word dots for the results of printing by the use of the invention is only for convenience since the printing formations are far from dots and are in no way the equivalent to the dots which are known in conventional or even electronic half tone printing which is known.

The variety of printing formations and patterns of their placement within the pixels is much greater than anything utilizing dots in the prior art. This is feasible because primarily there is a photoconductive coating for which the invention is especially advantageous which has a resolution that is much greater than other photoconductive coatings thereby enabling very small undischarged areas on its surface to be toned. These will form the printing elements or formations. This enables the use of a large number of elements to form the printing formation in each pixel without any detectable degradation of the resolution of the reproduced image. This advantage is one of the principal advantages of the invention and is in addition to the decrease if not elimination of moire interference patterns.

The preferred form of the invention utilizes 19 elements of discharge to form each imaged pixel thereby enabling several hundred different gradients of gray to be produced. With such pixels and multiple placement of the undischarged formations within the pixel over 30,000 different patterns can be produced giving a degree of density gradient never before achieved using conventional and known electronic methods with the conventional materials available at this time, and in addition decreasing the possibility of forming moire interference patterns or rosettes to a practical insignificance.

In summary, the printing formations for each degree of density of the gray scale are irregular in geometric configuration due to the manner of forming the same; the irregularity is increased because there are different locations within the pixel where these formations are placed; and the differing patterns of adjacent pixels as well as their interleaved arrangement produces more irregularity without sacrificing any of the resolution, gray scale or quality of the resulting printed image.

Typical prior art disclosing technique generally related to the subject matter of this invention comprise the following patents:
U.S. Pat. No. 4,084,259
U.S. Pat. No. 3,922,484
and some of the references cited in the said patents.

SUMMARY OF THE INVENTION

A drum or a flat plate carrying an electrophotographic member having a photoconductive coating is selectively exposed by means of a low power laser beam which has been modulated into a plurality of rays. The latent image on the coating which is represented by those incremental areas which have not been discharged are then developed by means of toning with suitable toner to form solid printing formations of irregular configuration and placement in a series of pixels. These are fixed as by fusing and the resulting toned member is treated to make the toned elements hydrophobic and the untoned elements hydrophilic. The resulting article is used as an offset lithographic printing plate without further processing.

The apparatus which performs the imaging comprises the following.

There is a source of digitial information in the form of words which represent the subject matter that is to be reproduced upon an electrophotographic member. The digital words are coupled to a register which latches each time it receives a signal from a counter which in turn is driven by a shaft encoder. The shaft encoder is coupled to the shaft that drives the drum carrying the electrophotographic member. The output of the register is coupled to a Read only Memory or ROM. The register selects a pattern in the ROM corresponding to the density represented by the digital word. In addition an output from the register indicates the density represented by the digital word to enable a pattern selector which may choose between several different patterns available in the ROM representing equal density values.

The counter is used to step through the six rows of each pattern selected by the word in response to signals from the shaft encoder. The ROM outputs enable signals indicating which columns of a pixel are to have elemental areas discharged. The enable outputs from the ROM are connected to oscillators which drive an electro-optical deflector to split and deflect a beam from a laser into a composite beam or rays. This composite beam or fine beam of rays is applied to the charged rotating cylinder of electrophotographic material to discharge certain selected elemental areas in the pixels.

The apparatus lays down the pixels in hexagonal form interleaved. In each pixel there are preferably nineteen centering points for the discharge elements formed by the rays. These are arranged in nine vertical columns and five horizontal rows, with a sixth row for spacing of the sequential pixels.

The arrangement permits the pixels to be generated with only five of the nine rays on at any time so that the laser power is not unnecessarily decreased during the pixel generation.

Moire interference pattern is decreased if not eliminated by quasi-random choice of distribution of the undischarged patterns within the pixels.

DESCRIPTION OF THE PREFERRED EMBODIMENT

In the preferred embodiment, the digital data representing the image to be printed or otherwise reproduced may be generated by an optical scanner or synthesized by a computer or other means. In any event the digital data comprises binary words representing the density of the individual picture elements or pixels which are to be reproduced. The digital data may be presented to the imaging device from a memory in which it has been stored. The data may be presented also, on line as it is generated or synthesized, if the generation or synthesization rate is equal to or less than the imaging rate.

The imaging device or imager used in the preferred embodiment of this invention is the apparatus described in U.S. Pat. Nos. 4,427,999, 4,428,000, and 4,468,707 previously referred to herein. In the said imaging device of said copending application, a laser beam was utilized to image an electrophotographic member that included a photoconductive coating that had previously been charged. The member was carried on a rotary drum, was toned on the drum and thereafter could be used to transfer the toned image or to serve as a medium for projection or printing of the image. In the case of printing, the toned image was used to carry ink in a printing press, the member having been treated to achieve hydrophilic and hydrophobic areas to enable offset lithographic use of the member as a printing plate.

The preferred use of the imaged member herein is as a printing plate and hence the same type of photoconductive, imagable coating is preferably the receptor or the laser beams which comprise the output from the apparatus of the invention. Such coating is that which is described and claimed in U.S. Pat. No. 4,025,339.

The apparatus of the invention may best be understood by considering that imaging of the electrophotographic member occurs by charging the member and immediately thereafter moving a composite beam of radiant energy rays over the member to scan onto the surface of the member a geometric pattern that is to represent an image. The scanning is effected by a predetermined program or relative movement of the beam over the member defining the length of adjacent parallel scan lines and the spacing between the parallel scan lines.

The composite beam comprises radiant energy from a laser beam that is modulated to turn certain rays on and off while moving the beam along one of the parallel lines. The geometric pattern comprises a consecutive series of microscopic pixels of discrete groupings of charged and discharged elements along one of said lines. Each imaged pixel has elements formed therein to represent the density desired for that incremented area.

Figure 1:
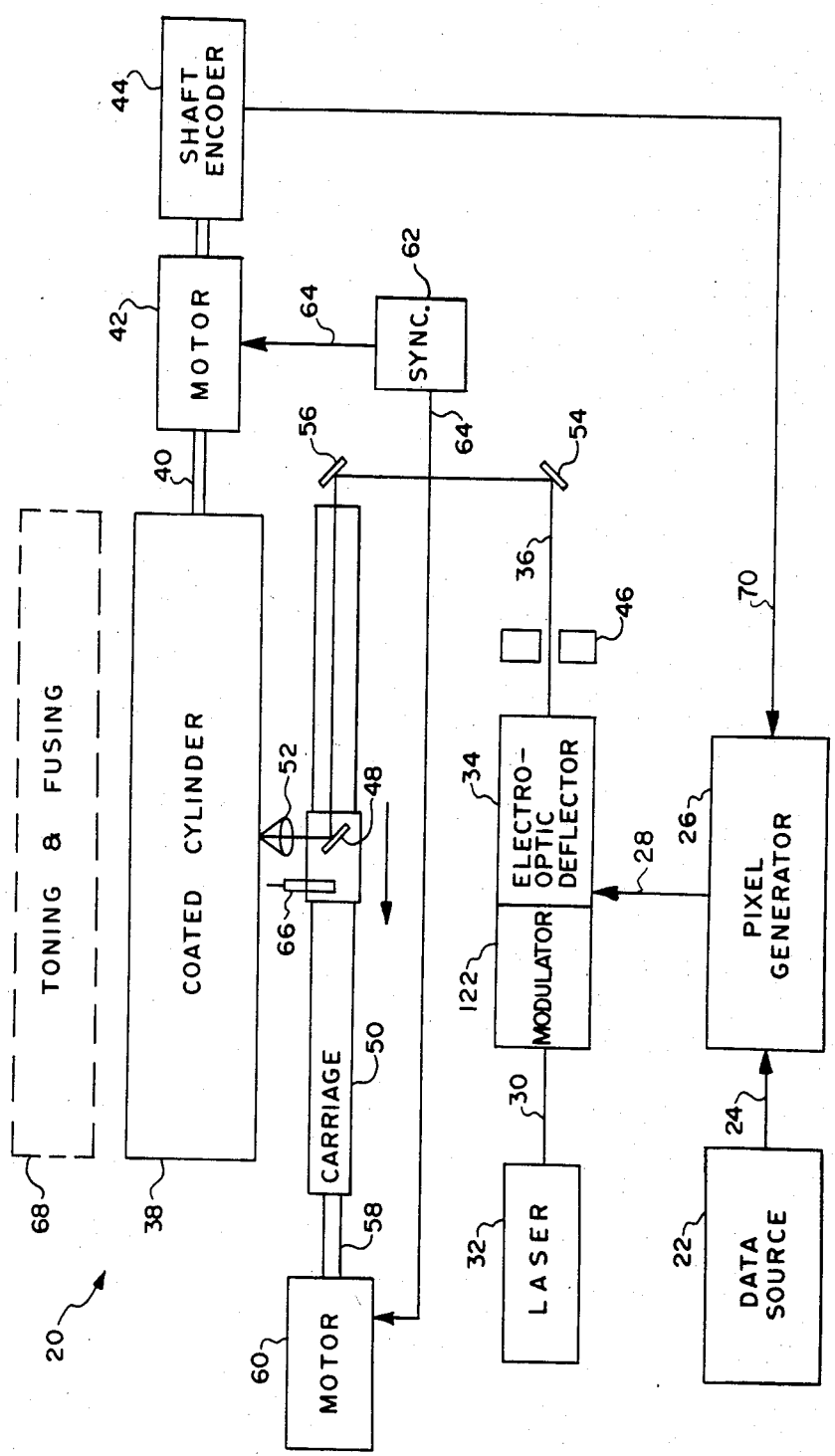
FIG. 1 is a block diagram of an apparatus for making printing plates that is constructed in accordance with the invention and uses the method of the invention.

Referring now to FIG. 1 of the drawings, the apparatus of the invention is there illustrated diagrammatically by the reference character 20. Basically one may visualize the apparatus best by considering that its purpose is to receive data from a source representing that which it is desired to reproduce, converting that data into signals of a type which can be handled by a radiant energy beam device such as a laser and which can image an electrophotographic member in accordance with a desired pattern and effecting the imaging properly. The invention is believed to include the combination of a particular type of so-called imaging device with the converting part of the apparatus as well as certain subaspects which are useful in other systems for imaging electrophotographic members.

It is also pointed out that while the preferred purpose of the invention is to make offset lithographic plates by electrostatic techniques, any use of an electrophotographic member will find advantages where the member has been imaged according to the invention.

The source of data of the apparatus 20 is represented by the block 22 designated DATA SOURCE in FIG. 1. This source, as indicated, may be an optical scanner, a computer or the like which is providing signals representing graphics, drawings, text etc. This may include synthetic signals generated artifically. The general requirements are that such signals include information as to density as well as other content. For use in the invention they are converted into binary signals by some means included in the block 22 which are known to those skilled in this art.

Figure 7:
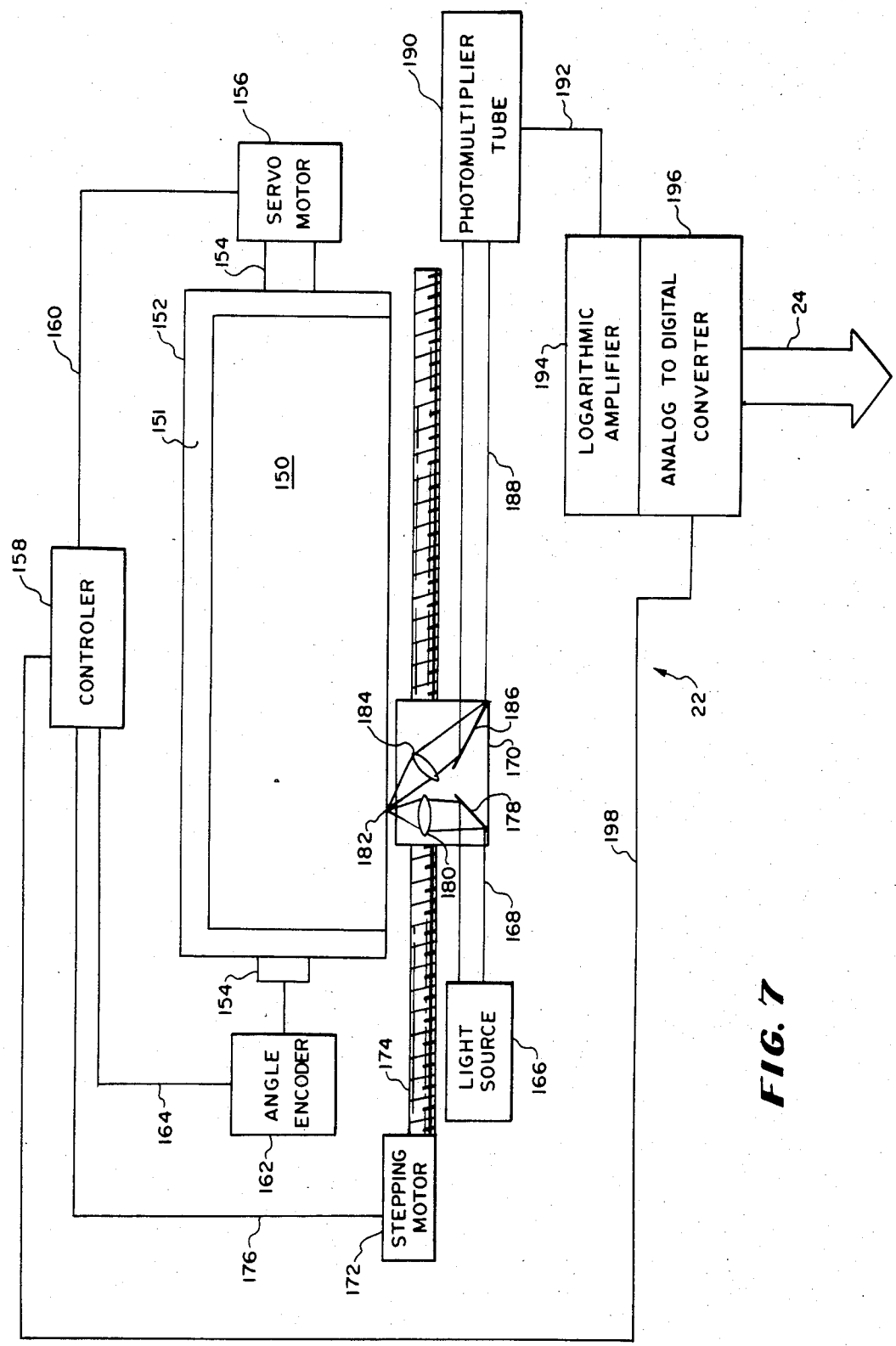
FIG. 7 is a block diagram of an apparatus for sourcing data from a print mounted on a drum.

In FIG. 7, a data source 22 is illustrated for sensing the density of incremental areas of a reflective original image. The original image in the form of such as a print 150 is carried on the exterior surface 151 of a mounting means such as a drum 152. Drum 152 is driven in rotation about its axle 154 by a servomotor 156 at an angular speed that is controlled by controller 158 over leads 160. An angle encoder 162 is coupled to axle 154 and provides an indication of the angular rotation speed of drum 152 to controller 158 over leads 164.

A light source 166 provides a source beam 168 of white light to a carriage 170 that is moved in translation axially of drum 152 and adjacent the surface 151 and print 150. Carriage 170 is driven by stepping motor 172 through screw 174, and the driving of stepping motor 172 is controlled by controller 158 over leads 176.

Source beam 168 is reflected by mirror 178 on carriage 170 to and through a spot forming lens 180 and then onto the surface of print 150. The spot of light formed on the print at 182 has an area that defines the desired scanning area or pixel of print 150. The carriage 170 is arranged to move along the direction of source beam 168 and thus the spot of source beam focused at 182 always has a substantially constant size and a substantially constant energy content.

The light energy from source beam 168 that is reflected from print 150 at sensing spot 182 by other than specular reflection is collected, partially, by collecting lens 184 on carriage 170 and is direction to reflecting mirror 186 and then, in the form of reflected beam 188, to photomulipler tube 190. Photomultiplier tube 190 converts the intensity of the reflected beam 188 to an electrical signal of corresponding amplitude. This electrical signal is carried on leads 192 to a logarithmic amplifier 194 and then to analog to digital converter 196.

In effect, information concerning the relative density of the print 150 at incremental pixels thereof is contained in the reflected light collected by lens 184 and forming reflected beam 188. This information is transformed from an optical to an electrical form in photomultiplier 190; is transformed from reflective to density data in logarithmic amplifier 194; and is transformed from analog to digital data in converter 196. The output of converter 196 on leads 24 forms the data input by the pixel generator 26 in FIG. 1. Alternatively the data on leads 24 may be stored for inputting to pixel generator at a later time, or as desired.

Data is output on leads 24 in response to control signals on leads 198 from controller 158. Controller 158 may be such as hard-wired to provide a desired relative movement of the print and scanning spot 182, i.e. the drum 152 is angularly rotated either continuously or in steps and the carriage 170 is translationally moved either continuously or in steps to sense desired incremental areas of the print 150. Additionally, the signals on leads 198 occur in timed relationship to the alignment of spot 182 with desired print 152 pixels so that the data on leads 24 is representative of the desired print pixels Effectively, the signals on leads 198 indicate the sample intervals for converter 196.

Such a scanning device is known and readily available commercially.

The binary signals from the source 22 appear on the channels which will be mentioned below but which can be collectively designated 24 in FIG. 1 and are fed to the pixel generator 26. The signals which are produced by the pixel generator 26 are those which control the laser beam and these appear at the channel 28. A substantial portion of the invention is concerned with the makeup of the pixel generator 26 since this is a vital factor in achieving the high quality of reproduction and the important resolution of which the invention is capable. It also is significant in substantially reducing, if not eliminating moire patterns in the resulting graphics which are produced by the apparatus 20.

The information which is contained in the output of the pixel generator 26 is used to cause deflection of a laser beam 30 generated by a laser 32 and passed through an acousto optical deflector 34. This results in a radiant energy pattern of a composite beam of rays which may be as little as a single ray indicated at 36. These rays 36 perform the actual imaging which has been mentioned onto the rotating cylinder 38.

The cylinder 38 is an electrophotographic member which may be in the form of a sheet of metal or synthetic resin film such as polyester coated with the photoconductive coating which is described in said above mentioned patent. It is shown here mounted on a mandrel (not shown) carried on a shaft 40 driven by a motor 42 which at the same time drives a signal producing device which is here designated shaft encoder 44. The function of the shaft encoder 44 is to provide a signal or signals on lead 70 which give information concerning the exact rotational position of the shaft 40 at all times. This provides a control which is required to assure proper synchronization of the signals at 28 with the rotation of the cylinder 38.

The output ray or rays from the deflector 34 will be modified by the beam stop 46 so that all deflected rays appear at 36. The undeflected main beam and such harmonic or stray energy as undesirable are removed. The composite or fine beam 36 is guided to a mirror 48 that is mounted on a carriage 50 and reflected by the mirror 48 through a suitable optical system such as a lens 52 onto the surface of the cylinder 38. In the course of its guidance, the composite beam 36 may be bent by mirrors such as 54 and 56 or by prisms and the like. The carriage 50 is driven by a lead screw 58 that is rotated by a motor 60. The motor 60 and the motor 42 are required to be rotated at speeds having a specific relationship in order that the image be laid down properly on the cylinder 38. A suitable synchronizing device is provided for this purpose as indicated by the block 62 in an electrical connection 64 extending between the motors. Synchronization can be achieved by a mechanical connection or, if desired, the same motor may drive both the carriage 50 and the shaft 40 through suitable gear boxes.

The relative movement of fine beam 36 over the surface of cylinder 38 in FIG. 1 is controlled to correspond to the relative movement of the scanning spot 182 over the print 150 in FIG. 7.

In the course of imaging it is to be understood that the carriage and the cylinder will normally be enclosed against ambient light. The carriage 50 is provided with a charging device which is indicated symbolically at 66. After the latent image has been formed by the incidence of the composite beam 36, the cylinder is toned and fused by a device which is indicated at 68. This may be done after the entire cylinder has been imaged with the latent image or may be done progressively while imaging is being effected by the composite beam 36.

Figure 2:
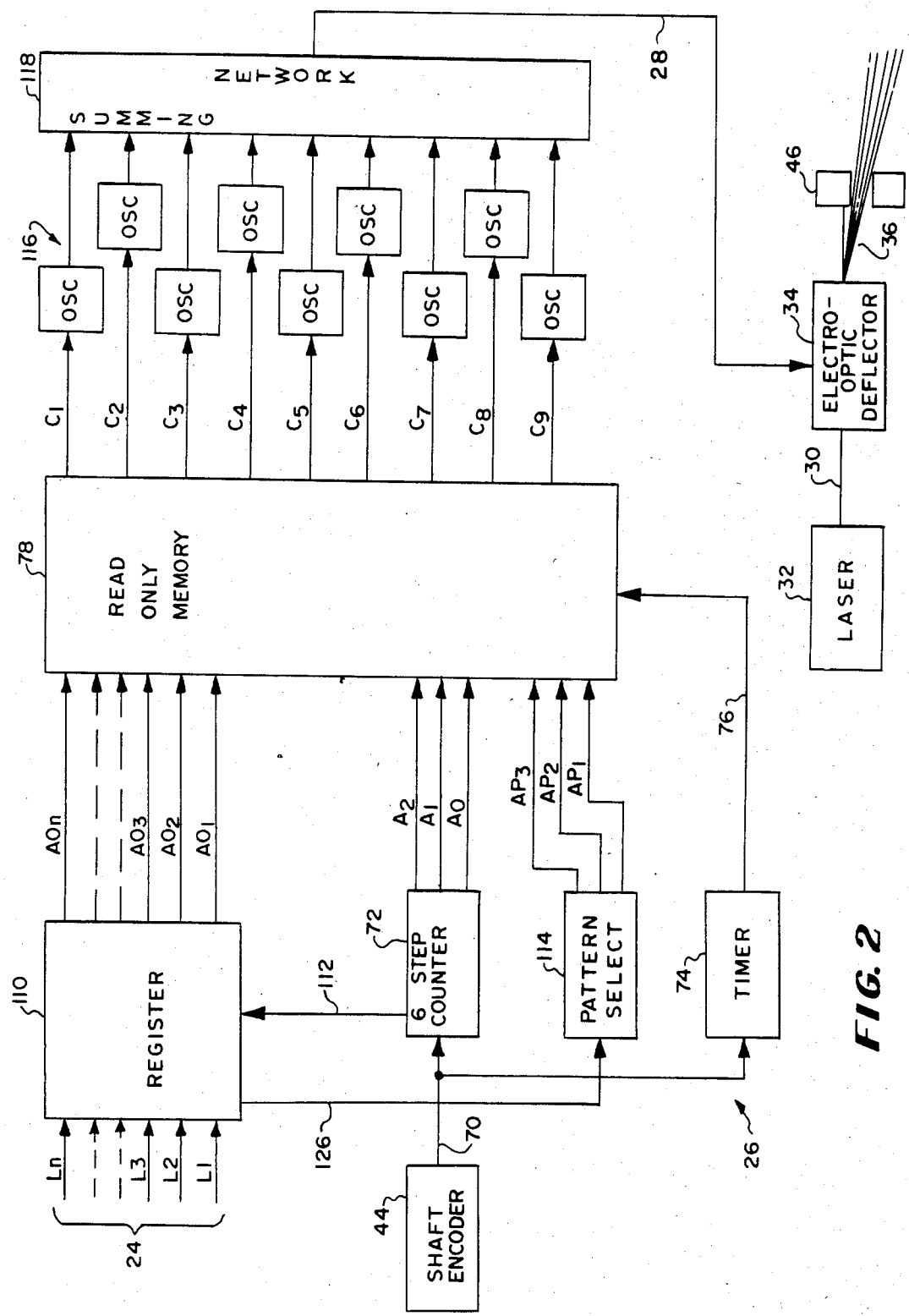
FIG. 2 is a more detailed block diagram of the pixel generator portion of the diagram of FIG. 1.

In FIG. 2 the pixel generator 26 is shown in more detail than in FIG. 1. The shaft encoder 44 is shown on the left and its coupling to the pixel generator 26 is represented by the line 70 which extends to a 6 step counter 72 and to a timer 74 which provides a strobe signal at 76 to the read only memory element 78 to be explained hereinafter.

It should be kept in mind that the pixel which is the basic configuration utilized for reproduction is a hexagon and that the individual elements of information in each pixel will comprise increments on the photoconductive coating of the electrophotographic member which will remain charged after exposure. The composite beam of rays is will discharge all of the area of each pixel except those which it is desired to carry toner. These areas may be referred to hereinafter as black for the increments retaining their charge and white for the increments which have been discharged although the actual toner applied may be of a different color and further reverse toning may be effected if desired.

Figure 4:
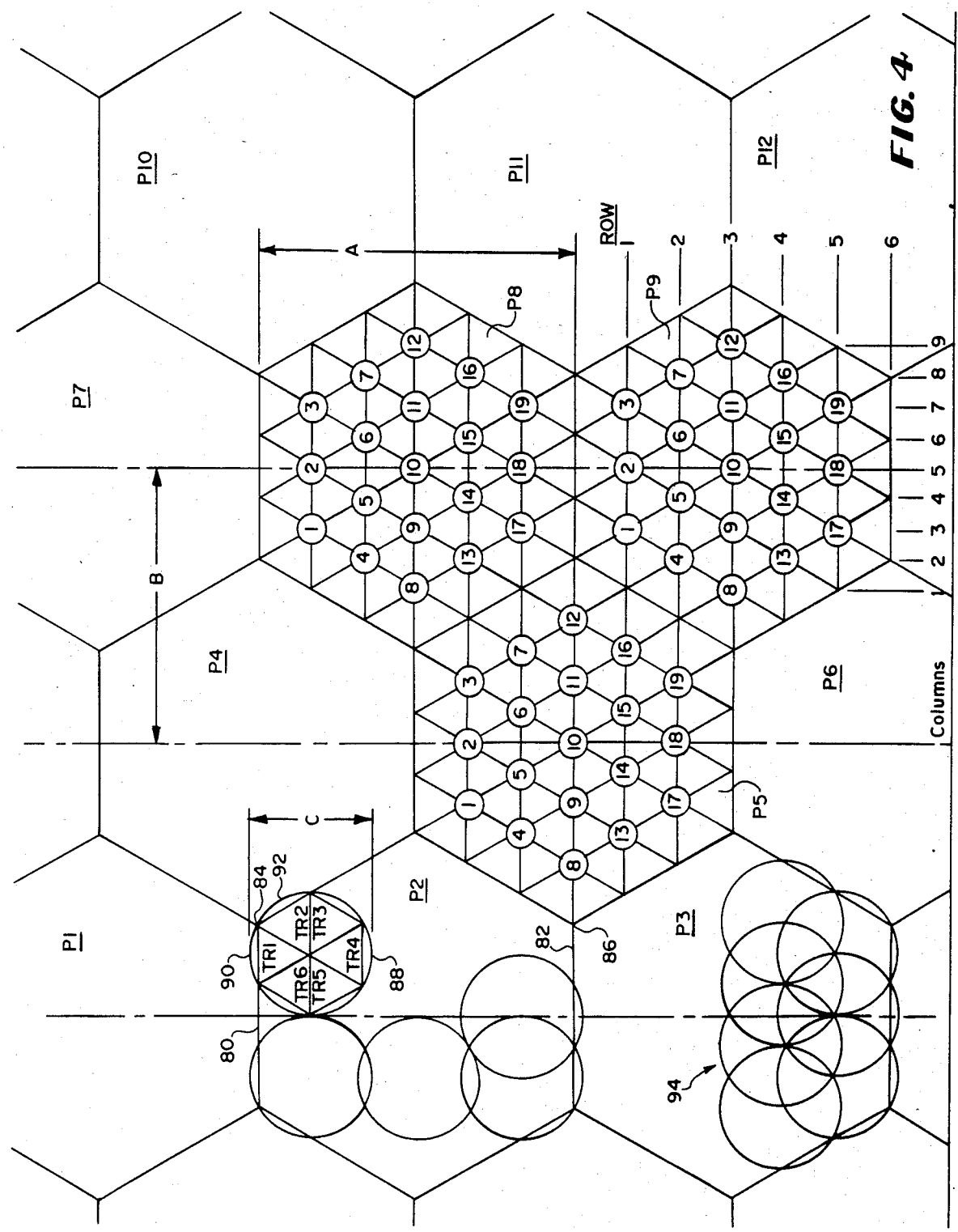
FIG. 4 is a chart of a field of pixels which is used in the explanation of the invention.
Figure 5:
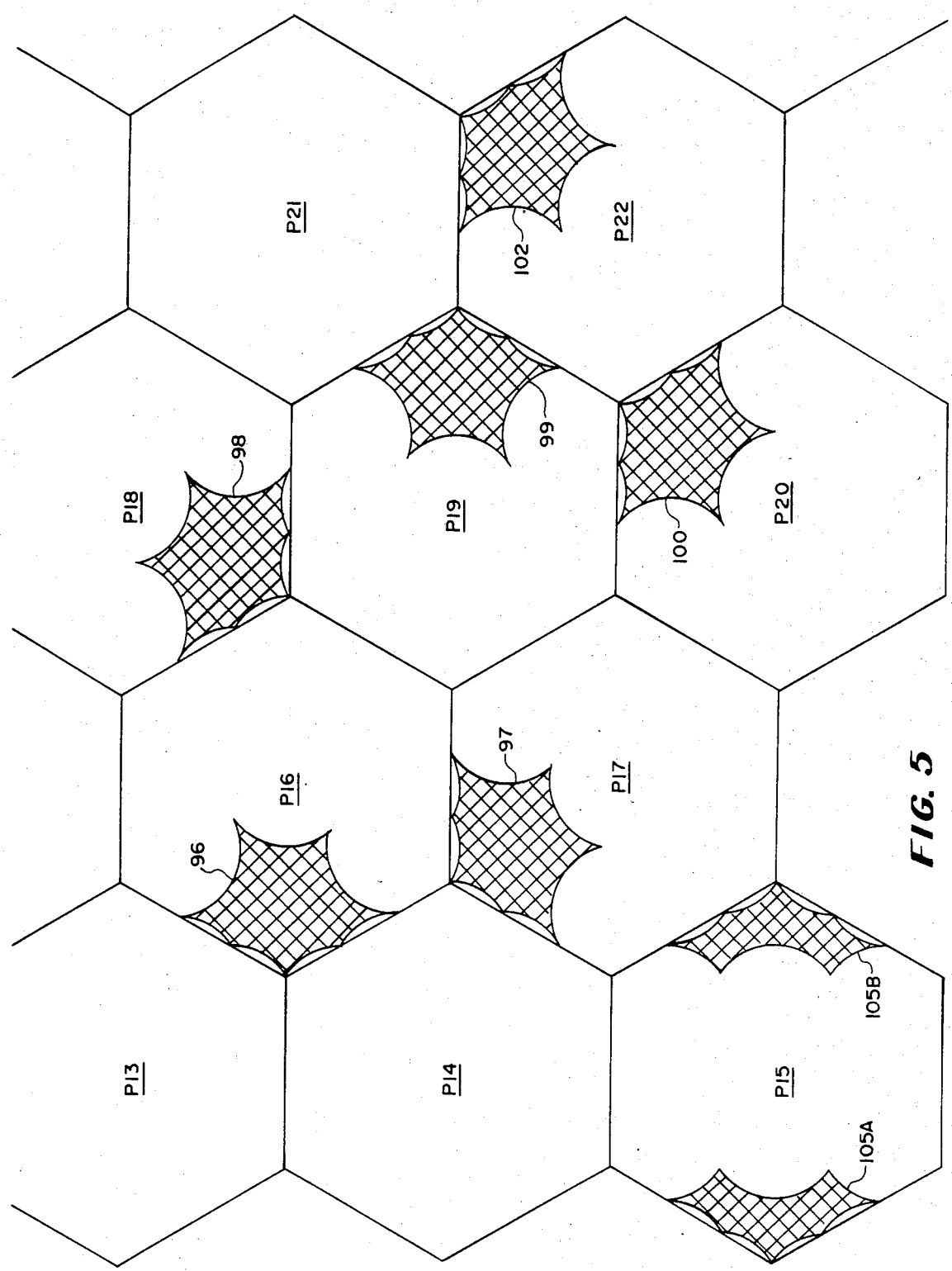
FIG. 5 is another chart of a field of pixels showing the manner in which discharged areas result in undischarged areas in different locations in the pixels.

The pixel which is generated by the pixel generator 26 of FIG. 2 should perhaps be examined for a moment at this point in FIGS. 4 and 5 in order to understand what is being done by the pixel generator. In FIG. 4 there is depicted a field of pixels which may be presumed to be laid out on the receptor comprising the photoconductive surface. The pixels are hexagonal areas designated P1 and P12 inclusive and are parts of an allover pattern of hexagons which cover the photoconductive surface. Obviously, the defining lines are imaginary and merely represent a theoretical geometric pattern which for convenience describes the manner in which the imaging is effected.

The composite beam of rays is going to remove charge from the pixels selectively, and the possibility for removal is represented in this case by elements of discharge which are generally circular and which account for the entire interior of each pixel. The pixels according to the invention are arranged in interleaved columns so that the field of pixels may be considered to occupy all of the area. Pixels P1, P2 and P3 are shown with their top and bottom flat sides respectively in common at 80 and 82. The next pixels above and below will also be arranged in this way but are not numbered. The next column of pixels is laid down interleaved or staggered; hence the pixels P4, P5 and P6 have their left hand apexes at the location of the common flat sides 80 and 82 as indidated for example at 84 and 86. In this way, the pixels P7, P8 and P9 are at the same levels (considered vertically) as the pixels P1, P2 and P3, respectively; the pixels P10, P11 and P12 are at the same levels as the pixels P4, P5 and P6, respectively, etc.

The distance between the vertical center lines of the pixels is designated B in FIG. 4; the dimension across flats is designated A; the diameter of the element of discharge which is indicated as an example at 88 in pixel P2 is designated C. Since the number of pixels per centimeter as produced by the pixel generator of the invention will be from 60 to 80 per centimeter, the diameter C will be between 64 and 48 microns.

The pixels P5, P8 and P9 have had centering points laid out in them which are numbered and which can be seen to be formed at the junctures of rows and columns that are marked out alongside of and below pixel P9. There are 19 such centering points in each pixel, and these are arranged in nine vertical columns and six horizontal rows. The columns are all confined within each pixel between its side apexes (all pixels are considered to be oriented exactly the same with its flat sides top and bottom and apexes right and left) while the rows are formed somewhat differently. Five of the rows which will have centering points are within the confines of the pixel between top and bottom flats while the sixth row which will never have centering points in a given pixel is coincident with the bottom flat of the hexagon. This is a spacing expedient to be explained later.

The centering points which have been described are the centers of the circular elements such as 88 which are going to be discharged by the composite beam of rays. As seen, the circular element 88 which is the same as all others is large enough so that in addition to covering a certain area within its pixel, overlaps into adjoining pixels. Thus, the circular element 88 not only discharges the area within the pixel P2 which it encompasses but also has a chordal slice or segment which it discharges in each of the pixels P1 and P4 as indicated at 90 and 92.

If we drew a line between each of the centering points horizontally and diagonally we would see the allover patterns of generally hexagonal areas which can be seen in the pixels P5, P8 an P9 and of course these hexagons have the appearance that they are made up of equilateral triangles. Thus, the circular discharge elements such as 88 will discharge the area around its centering point comprised of the six equilateral triangles surrounding that centering point plus six more chordal segments beyond the hexagon defined by those triangles. And since every other circular element will also discharge the photoconductive surface of the electrophotographic member in the same way, the discharged circular areas which are side by side always overlap.

In FIG. 4, the pixel P3 has seven of the bottom circular elements shown in outline at 94 and their overlapped areas are obvious. In addition, there can be seen the seven overlapped chordal segments of discharge area that protrude into adjoining pixels including the pixel P6. For explanatory purposes, the total discharged area of any pixel can be approximated by the triangles which are included in the circular elements of discharge. The more circular elements of discharge in a given pixel the closer the approximation because of the overlap within the pixel. In the circular element 88 the equilateral triangles are identified as TR1 to TR6 inclusive.

Returning now to the pixel P9 which designates the columns and row, one can note that in the vertical columns there is only one centering point in each of columns 1 and 9; two centering points in each of columns 2, 4, 6 and 8; and three points in each of columns 3, 5 and 7. These conditions are requirements of the pixel generator and must be met during the laying down of the discharge elements. The composite beam 36 which makes one pass to provide the vertical column information for generating the discharge elements at the centering points for the pixel which is being described will be composed of a maximum of nine smaller rays, all passing over the total pixel area at one time. This assumes that all will be used for any given pixel, but, the maximum number of rays that will be operating at any given time for this configuration will be five because, as noted, at no time are there more than five centering points being laid down. Look for example at the center row where there are discharge elements 8, 9, 10, 11 and 12, these being generated in columns 1, 3, 5, 7 and 9. Of course, the minimum number of rays operating will be zero.

Summarizing, the vertical columns of centering points for discharge elements are controlled by the number of rays in the composite beam 36. The rows are controlled by the information that is combined from the shaft encoder with the rays being enabled by the generator 26 as explained hereinafter.

Referring now to FIG. 5, there is depicted another field of pixels at P13 to P22 inclusive. In this case, a discharge area which has resulted from the discharge of thirteen circular elements has left an undischarged area comprised of the remainder in each of the pixels P15, P16, P17, P18, P19, P20 and P22. We may consider that all of the areas of the remaining pixels illustrated have been fully discharged. In each of the pixels which have undischarged areas, such areas are designated 96, 97, 98, 99, 100, 102, 105A and 105B. All but the latter two are identical in configuration, such configuration being quite irregular but nevertheless defined by the surrounding discharged areas. The differences between the first six mentioned areas are that each is placed at a different location in the pixel which contains it. In the case of the pixel P15, although the number of circular discharge elements discharged is the same as that of each of the other pixels, the total of the areas 105A and 105B is greater than the undischarged areas of the other pixels. The purpose of the Figure is to show that the discharged areas can be placed in different parts of the pixels for different effects and that the discharged areas can be divided for different effects. For example, if a certain density of printed area is required which is represented over a large area covering several pixels and the discharged areas occur in these pixels adjacent one another in side by side pixels, there may be a dark spot where there should not be and/or there may be moire effect. Thus, the pixels P16, P17, P18, P19, P20 and P22 have the areas 96, 97, 98, 99, 100 and 102 distributed with large spaces between them. The areas 105A and 105B total an undischarged area slightly greater than the others in FIG. 5 which provides a subtle difference in the resulting density of the printed element.

The different arrangement of the undischarged areas in the pixels of FIG. 5 can be achieved by suitable controls which are built into the pixel generator 26. For example, the output signals can be modified by providing rules represented by signals which have been stored in the memory of the generator and which instruct the generator where to place the discharged areas to reach certain results. There will thus be a plurality of alternate patterns for any given density which is desired and these can be called up either according to any given law which is built into the apparatus or at random or by quasi-random signals chosen from a given store of such. This can eliminate undesirable visual effects.

These signals can be controlled in accordance with many factors which are readily built into the store. For example, the spreading of the undischarged areas may be related to the total area discharge so that if the latter is small there need not be as great a distribution of the location of the undischarged areas. In other words if there is a small low density area it is not as important that there be no side by side undischarged areas in or near it than if there were a large low density area.

Referring now to FIG. 2, on the left the combined channel 24 which, as previously described derives from the data source 22, is shown to be comprised of a series of lines L1, L2, L3 . . . Ln which comprise the input to a register 110. The lines enable the formation of digital words from the information obtained from the source 22. The input to the source 22 will comprise density information and there may be a circuit or means to convert the density information into the binary words. The number of lines in the channel 24 will depend upon the density scale which it is desired to reproduce, the quality of reproduction being directly related to the number of gradients in the scale. The scale which is preferred for the apparatus comprising the invention herein is 32 steps or gradients and this can be achieved by a five bit binary word; hence the number of lines at 24 will be five.

The lines are coupled to the register 110 and the information represented by the binary words is latched each time that a word is received by the register 110. The latching occurs pursuant to a suitable signal from a counter 72 on the line 112 which in turn is controlled by the shaft encoder 44 through the signal line 70. The information which is latched into the register 110 is used in comparator 111 and to address a pattern for a pixel which has previously been stored in the ROM 78. This occurs on the address output lines A01, A02, A03 . . . AOn. Thus, the number of address output lines from comparator 111 will equal the number of input lines 24.

In addition to the address output lines which are coupled to the ROM 78 there are lines A0, A1 and A2 which are derived from the 6 step counter 72. This counter 72 is reset to binary 1 when the data word is latched in the register 110. The reason for the six steps is that this controls the occurrence of the rows 1 to 6 of the pixels which have been discussed in connection with FIG. 4. Three address states gives a possibility of eight binary addresses of which only six are used in this instance.

As signals are received from the shaft encoder 44 on the line 70 the six step counter 72 increments the binary address by steps of binary 1. These incremental steps sequentially address the respective rows of the selected pattern in the ROM 78. In this way the shaft encoder 44 controls the discharge of elements in each row of each pixel.

In addition the pattern select circuit 114 is used to determine the location within the pixel where the discharge will occur for preventing moire and other undesirable patterning or concentration of undischarged areas. In the preferred embodiment which is shown with three address pattern lines AP1, AP2 and AP3, one of eight different patterns may be selected for each different step or gradient of the density scale which the apparatus is capable of producing. These varied patterns may be selected on the basis of a predetermined program, at random, and/or related to the density of the surrounding area in which the discharged area will occur to prevent clumping.

The sample signals which are applied to the line 70 from the shaft encoder 44 are used in the timer 74 to enable a strobe 76 coupled as an input to the ROM 78. This strobe signal enables the outputs C1 through C9 of the ROM 78. These outputs provide the signals that establish the discharge elements at the centering points in the pixels in cooperation with the signals from the shaft encoder, these signals C1 through C9 controlling the column placement of the discharge elements. Each signal thus corresponds to one of the columns which were described in connection with FIG. 4.

The output signals of the ROM are coupled to respective oscillators 116 which provide a unique frequency for each of the selected outputs of the ROM 78. The oscillator outputs are coupled into a summing network 118. The signals from the ROM 78 are enabling signals and they choose the oscillators which are to operate at any time. Any signal turns the oscillator which is connected to its line to an "on" condition. If there is no signal on a given line that oscillator which is connected to that line will not be turned on and will provide no following signal into the summing network.

The output of the summing network appears on the line 28 which is connected to the acousto-optic deflector which splits or deflects secondary rays from the main laser beam 30 to achieve what has been previously called the composite beam 36. The latter is made up of the rays which correspond to the column signals emerging from the ROM. The direct laser beam and harmonic or interfering radiant energy is eliminated from the composite of rays 36 by means of the stop 46.

Figure 3:
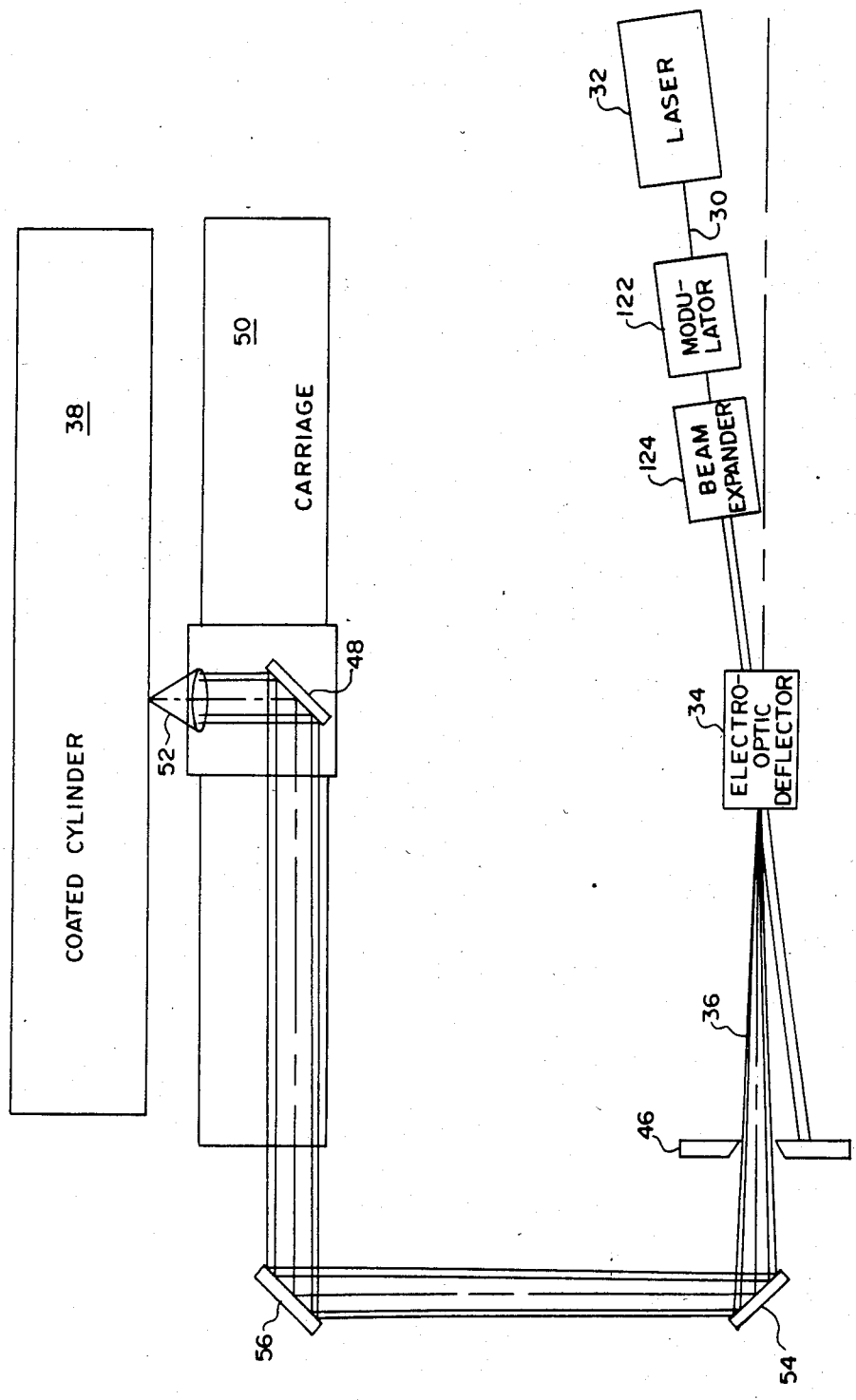
FIG. 3 is a detailed diagram showing the paths of the rays of the composite laser beam showing the manner in which the same are formed and directed against the electrophotographic member of the invention.

In FIG. 3 the path of the rays 36 can be followed as they emerge from the acousto-optic deflector 34 and pass through the beam stop 46. They are first bent by a reflector 54 toward the carriage 50 and then engage a second reflector 56 at the carriage so that they can be parallel to the carriage as it moves in its path. The carriage carries the reflector 48 which directs the rays 36 directly onto the photoconductive coating of the cylinder or drum 38 as previously explained. This is also disclosed in the copending application above mentioned.

The modulator 122 is actually a part of the beam or ray deflecting system because it is required to apply the beam 30 to the deflector 34 when the reflector 34 is stablized to achieve the discharge of particular areas of each pixel. It is timed by the shaft encoder and is shown in the same block as the deflector 34 in FIG. 1. The beam expander 124 is an optical system of lenses which adjusts the spread of the rays to enable proper direction of the same when applied to the photoconductive coating of the cylinder. The manner in which the rays bend without losing their integrity and their relationship to one another is seen by the lines indicated their paths in FIG. 3.

Figure 6:
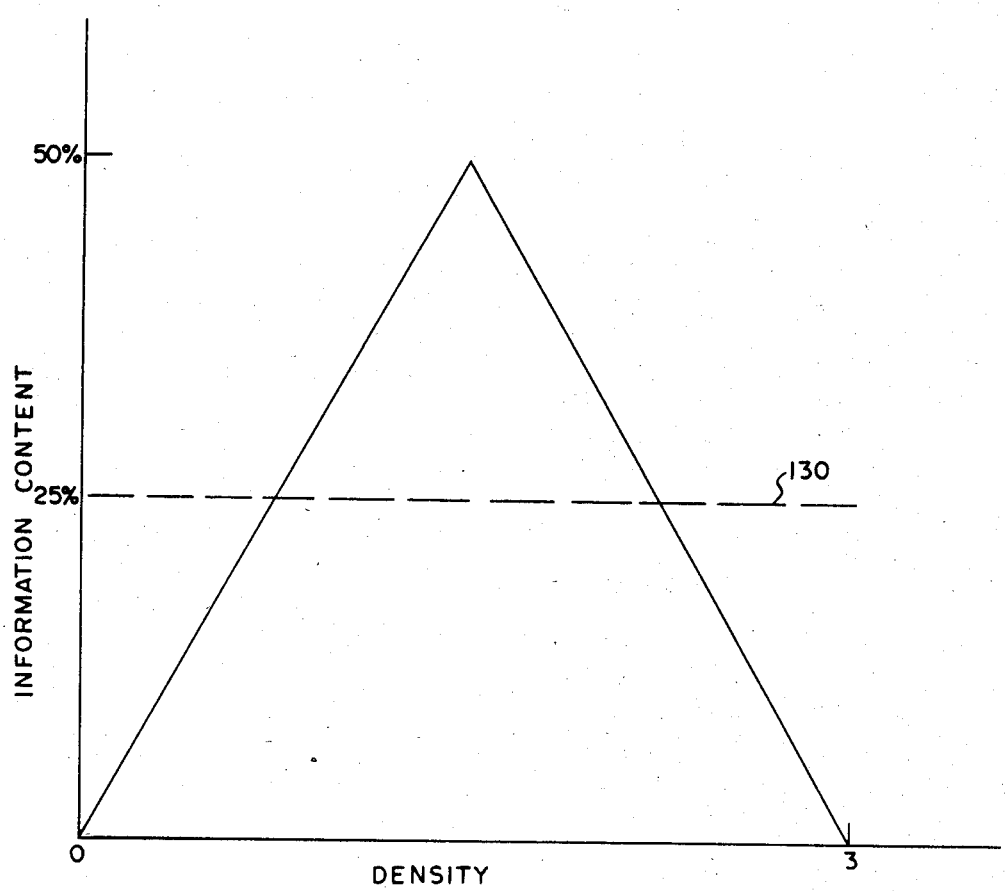
FIG. 6 is a chart showing a graph of density versus information content used to explain the effects of moire interference patterns as alleviated by the invention.

With respect to moire patterns, there is no real need to make any correction to the placement of the printing elements which result from discharging circular elements of each pixel for any cases where the density and resolution of the information being reproduced is low. This can be understood by the triangle which is shown in FIG. 6. The coordinates are resolution or information content on the left as the vertical coordinate and density on the bottom as the horizontal coordinate. A broken line is drawn at 130 across the apex of the triangle and this represents information content of about 25%. The right hand base apex of the triangle is at a density value of about 3 which represents dead black while the opposite base apex is at zero which represents dead white.

The triangle of FIG. 6 is an approximate typical information curve. It has been found that when the conditions of the information content and density occur in the peak of the triangle above the broken line 130, moire interference patterns are liable to occur. Accordingly, it is not necessary to complicate the apparatus of the invention by having the pattern selector 114 operate unless the critical condition is reached. Thus, the pattern selector is disabled to choose from the store of different patterns when the comparator 111 indicates that low density signals or high density signals are being received from the source by way of the channels 24. This signal is applied by way of the channel 126.

It is noted that other factors can be built into the apparatus 20 to control the printing elements which are laid down on the cylinder including subtleties of hue, contouring, shifting of overall patterns, editing, saturation effects, etc. These can be built into the pixel generator.

One of the important aspects of the invention is that the generation of the completed electrophotographic member occurs at relatively high speed. For example, the speed at which the photoconductive coating is charged and imaged is 1500 linear feet per minute. The drum carrying the electrophotographic member rotates at 1500 RPM and the carriage moves at a rather high speed. The character of the photoconductive coating is such that it must be capable of being imaged with the latent image in nanoseconds. This is coupled with a remarkable electrical anisotropy of the surface of the coating which enables the elements laid down to maintain their proper location and size during the time that they are applied and toned. Any surface leakage will result in spreading of the charged areas and destruction of the particular configuration of the elements rendering the controls and adjustments called for by the invention useless.

If we consider the chart of FIG. 4 and note that there is a large number of triangles—to be exact 54—in each of the hexagonal pixels, the density value of the printing element laid down will be directly related to the number of triangles and the precautions to be taken to prevent moire and interference can be chosen based upon such number. The number of exposed triangles in a given pixel will determine the combinations or possible different positions for the printing element made up of those triangles in a given pixel and these can be ascertained by examining the different combinations in the hexagon. The precise number of combinations can be worked out by computer and typical values are given below.

From a single triangle up to 5 triangles exposed there are no combinations that can be chosen in a single pixel, this being required to be done with the effects of adjacent pixels. For a six triangle discharged area there are 19 combinations, but for 7, 8, 9, 11, and 15 triangle exposed again this cannot be done in a single pixel. For 10 triangles exposed, the combinations available are 42. In the meantime, of course, the percentage of white which is produced has been increasing from zero or dead black with no triangles to 18.52% white with 10 triangles.

By computer a chart can be computed for all values and combinations. Examples are 16 triangles exposed, 29.63% white and 498 combinations or different positions possible; 39 triangles, 72.22% white and 30,400 different combinations or positions. The use of the word "position" in this context is not intended to convey the meaning that these are totally discrete positions about the interior of the pixel but rather that there are a certain number of different ways of combining those triangles to achieve the total exposed area. Since there will be slight differences in the actual configuration of each of these combinations it could be said that each occupies a different position.

As understood, when the electrophotographic member is removed from the apparatus it already has the toner fused thereon. It could be based upon metal or transparent plastic. To make it into a printing plate the electrophotographic member is immersed in a bath of some material which will render the toned elements oil attractive but water repellant (hydrophobic) while the nontoned areas are rendered oil repellant but water attractive (hydrophylic). The member is provided with punched holes or slots to enable it to fit onto a printing press of the offset lithographic type and used to print the graphics which it carries. In the case of color, the set of separations all go into the same press. Various means for a ensuring registration can be incorporated into the plates but this is not concerned with the invention.

The invention is especially adaptable for color because the original image can be scanned and digital words generated through color filters without making color separations. The separate printing plates are made from the store of digital words rather than from physical screened separations.

The preferred form of the invention has the electrophotographic member mounted on a rotating drum. This provides a convenient way of moving the carriage and generating signals in the shaft encoder for control of operation of the apparatus. It is feasible, however, to have the electrophotographic member arranged flat on what may be termed a flat bed imager. The adaptation of the invention to this form of device is concerned only with the mechanical problems that arise to meet the requirements of movement of the laser beam reflector 48 over the surface of the electrophotographic member and picking up suitable signals which locate the position of the beam at all times. The invention covers structure of this type within its ambit as should be understood.

It should be clear that many modifications and forms of the invention are capable of being effected without departing from the spirit or scope of the invention as defined in the appended claims.

What it is desired to secure by Letters Patent of the United States:

I claim:

1. Apparatus for imaging an electrophotographic member with an array of discharged elements of such configuration and placement as to enable the member to be utilized for producing a graphic image upon a receptor by printing, said apparatus comprising:
    A. means for mounting an electrophotographic member and a radiant energy applying device in an arrangement which will result in a pattern of movement of the member and device relative to one another such that the device will apply radiant energy over a substantial and predetermined area of said member, B. drive means for causing the said relative movement and having sample signal producing means identifying the disposition of the radiant energy applying device and the mounting means at all times, C. means for charging the electrophotographic member arranged to follow said pattern of movement and to charge the electrophotographic member prior to the operation of the radiant energy applying device, D. a source of radiant energy, means forming a fine beam of such energy, means directing said fine beam to said radiant energy applying device and beam modulating and deflecting means interposed between the source and the directing means, the modulating and deflecting means being constructed to be capable of dividing said fine beam into a composite plurality of rays of radiant energy capable of being directed to said electrophotographic member simultaneously, said composite plurality of rays being capable of comprising only a single ray if so controlled, E. means for forming pixels of charged and discharged elements on said electrophotographic member, the charged elements adapted to reproduce increments of said graphic image which normally have density and the discharged elements adapted to reproduce the increments of said graphic image which normally comprise the blank background, said pixel forming means comprising:

i. a register for latching digital words, ii. means for coupling the sample signal to said register to control the latching of said register, iii. means adapted to provide an input for said register in the form of a series of digital words representing said graphic image, each of said digital words representing the density of a particular incremental area of said graphic image that will form a pixel on said electrophotographic member, iv. a store having a plurality of beam modulating data signals representing area-weighted patterns stored therein, each stored pattern corresponding to a predetermined density of an incremental area of said electrophotographic member at which a pixel is to be formed, and the beam modulating data signals of each pattern being grouped together and representative of rows and columns and defining where in the pixel there will be discharge elements to form said pattern on said electrophotographic member, v. means for randomly selecting a single plural pattern of the store, vi. said means for coupling the sample signal to said register additionally coupling the sample signal to said store, vii. the register being coupled with said store and acting to select a group of beam modulating data signals representative of a particular area-weighted pattern that is individual to the density of the incremental area represented by the digital word latched to the register at the time of selecting, viii. said store having a plurality of output channels, said output channels outputting beam modulating signals of the selected pattern on the respective channels, the output beam modulating signals occurring time-wise and at certain chosen channels to correspond to the placement of the said discharged elements for forming said pixel, ix. and means for coupling the output beam modulating signals on the channels to said beam modulating and deflecting means, F. whereby to form a pixel on said electrophotographic member for each selected pattern in one pass of said composite plurality of rays.

2. The apparatus as claimed in claim 1 in which the store is constructed and arranged to produce said output beam modulating signals on said channels in a sequence with respect to each channel and with the choice of channels such that the modulated and deflected rays, when applied to said electrophotographic member, will produce a pixel upon said member that is an equilateral polygon of more than four sides, there being one pixel formed for each digital word and the pixels being formed in serial groups in the direction of relative movement.

3. The apparatus as claimed in claim 2 in which the polygon is a hexagon and the pixels are arranged flat side to flat side in said direction of movement and adjacent pixels are interleaved.

4. The apparatus as claimed in claim 1 in which the rays that are directed on the electrophotographic member produce generally circular discharged elements on the member in the field of the pixel, said circular elements being laid down on said member in accordance with the output beam modulating signals of the store being such that the circular discharged elements are of a size and placement relative to the pixel and one another so that side by side discharged elements overlap and elements adjacent the boundaries of the pixel overlap into the fields of adjacent pixels.

5. The apparatus as claimed in claim 3 in which the rays that are directed onto the electrophotographic member produce generally circular discharged elements on the member in the field of the pixel, said circular elements being laid down on said member in accordance with the output beam modulating signals of the store, the output beam modulating signals of the store being such that the circular discharged elements are of a size and placement relative to the pixel and one another so that side by side discharged elements overlap and elements adjacent the boundaries of the pixel overlap into the fields of adjacent pixels.

6. The apparatus as claimed in claim 1, in which the rays that are directed on the electrophotographic member produce generally circular discharged elements on the member in the field of the pixel, said circular elements being laid down in accordance with the output beam modulating signals of the store in rows and columns such that the maximum discharged area encompassed by forming a certain number of said elements on said member will result in the discharge of at least all of the area within a pixel.

7. The apparatus as claimed in claim 6 in which the store is constructed and arranged to produce said output beam modulating signals on said channels in a sequence with respect to each channel and with the choice of channels such that the modulated and deflected rays, when applied to said electrophotographic member will produce a pixel upon said member that is an equilateral polygon of more than four sides, there being one pixel formed for each digital word and the pixels being formed in serial groups in the direction of relative movement.

8. The apparatus as claimed in claim 7 in which the polygon is a hexagon and the pixels are arranged flat side to flat side in said direction of movement and adjacent pixels are interleaved.

9. The apparatus as claimed in claim 8 in which the drive means moves the means mounting the electrophotographic member and the radiant energy applying device relative to one another in a directon in which the columns are formed within each pixel and each pixel is formed in one pass of said rays across said member, projected through said radiant energy applying device.

10. The apparatus as claimed in claim 8 in which the drive means moves the means mounting the electrophotographic member and the radiant energy applying device relative to one another in a direction in which the columns are formed within each pixel and the rows are transverse of said direction, and the interleaving of adjacent groups of pixels being effected by the output beam modulating signals of the store such that adjacent sequential groups of pixels are offset by half a hexagon so that the apexes of any group of pixels are aligned with the flats or groups of pixels adjacent thereto.

11. The apparatus as claimed in claim 8 in which the output beam modulating signals of said store are such that the circular discharged elements are of a size and placement relative to the pixel and one another so that side by side discharged elements overlap and elements adjacent the boundaries of the pixel overlap into the fields of adjacent pixels.

12. The apparatus as claimed in claim 3 in which the output beam modulating signals of the store are such that the rays that are directed onto the electrophotographic member form discharged elements in rows and columns and the discharged elements of alternate rows in each pixel are staggered, the number of discharged elements at the center of the hexagon from apex to apex in a direction transverse to the direction of relative movement being maximum and the number of discharged elements in the rows adjacent the flats being a minimum whereby the number of total columns is substantially greater than the maximum number of discharged elements in any row but the number of rays required to be energized at any time is no more than the maximum number of said discharged elements in the center row.

13. The apparatus as claimed in claim 1 in which said means for randomly selecting a single plural pattern is coupled to said register and is enabled by said register in accordance with the density and information content of the area at least within and adjacent the pixel to be reproduced.

14. The apparatus as claimed in claim 1 in which said means for randomly selecting the single plural pattern is coupled to said store and is modified by said store in accordance with the location of discharged elements in the pixels in the vicinity of the pixel in which said pattern is being formed.

15. The apparatus of claim 1 in which said source includes means for scanning an image, which it is desired to apply to said electrophotographic member, by means of a beam of radiant energy that has a substantially constant size and a substantially constant energy content, sensor means for detecting the analog modification of energy content resulting from the variation in intensity of the reflected energy content of respective incremental areas of the image, the scanning being effected in a movement which is related to said certain program of movements and means for converting said analog signals into said series of digital words, the scanning movement being synchronized with said certain program of movement.

16. Apparatus for imaging an electrophotographic member with an array of discharged elements of such configuration and placement to enable the member to be utilized for producing a graphic image upon a receptor by printing, said apparatus comprising:

A. input means for acquiring a series of digital words from a source of such words representative of the graphic image, each word representing a density of an incremental area of the graphic image, B. mounting means mounting a charged electrostatic member upon which the graphic image is to be reproduced, the mounting means including discharge means for discharging said member selectively with a fine beam of radiant energy that forms pixels over the area of the electrophotographic member, the mounting means further including movement means for moving the member and fine beam relative on one another in a certain program of movement, said fine beam generally being a composite of a plurality of individual rays but at times comprising as little as a single ray, C. encoder means for generating sample signals that are indicative of said relative movement, D. memory means providing a store of beam modulating data signals representing plural area-weighted patterns, each pattern corresponding to a predetermined density of image of a pixel which is to be reproduced upon said electrophotographic member, and the beam modulating data signals of each pattern being grouped together representative of rows and columns and defining the location in the pixel of discharge elements that will form said pattern on said electrophotographic member, E. means for randomly selecting a single plural pattern from the store, F. counter means for applying the digital words and the sample signals simultaneously to said store, each word being applied while a sequentially produced group of a particular number of the sample signals is applied, the digital words each being effective to select a group of beam modulating data signals representative of a particular pattern which will result in said pixel upon the application of said rays, G. the sample signals being effective to indicate the rows in the pixel, at which discharged elements can be located to form said pattern within said pixel, H. said memory means outputting from said store, for each digital word and each row chosen, a plurality of output beam modulating signals describing column by column the discharge elements for said pixel, I. energy means providing a source of radiant energy having a beam of such radiant energy, J. modulator and deflector means for splitting said beam into said composite of a plurality of rays in accordance with said output beam modulating signals and radiant energy applying means for directing said rays as said fine beam onto said electrophotographic member to form said pixels on said electrophotographic member, and effect the formation of pixels for all of the digital words on said electrophotographic member; and K. toning means for toning said electrophotographic member.

17. The apparatus of claim 16 in which the memory means outputs from said store said output beam modulating signals in a sequence such that the modulated and deflected rays, when applied to said electrophotographic member, will produce a pixel upon said member that is an equilateral polygon of more than four sides, there being one pixel formed for each digital word and the pixels being formed in serial groups in the direction of relative movement.

18. The apparatus of claim 17 in which the polygon is a hexagon and the pixels are arranged flat side to flat side in said direction of movement and adjacent pixels are interleaved.

19. The apparatus of claim 18 in which the rays that are directed onto the electrophotographic member produce generally circular discharged elements on the member in the field of the pixel, said circular elements being laid down on said member in accordance with the output beam modulating signals of the store, the output beam modulating signals of the store being such that the circular discharged elements are of a size and placement relative to the pixel and one another so that side by side discharged elements overlap and elements adjacent the boundaries of the pixel overlap into the fields of adjacent pixels.

20. The apparatus of claim 18 in which the rays that are directed onto the electrophotographic member produce generally circular discharged elements on the member in the field of the pixel, said circular elements being laid down on said member in accordance with the output beam modulating signals of the store, the output beam modulating signals of the store being such that the circular discharged elements are of a size and placement relative to the pixel and one another so that side by side discharged elements overlap and elements adjacent the boundaries of the pixel overlap into the fields of adjacent pixels.

21. The apparatus of claim 16 in which the rays that are directed on the electrophotographic member produce generally circular discharged elements on the member in the field of the pixel, said circular elements being laid down in accordance with the output beam modulating signals of the store in rows and columns such that the maximum discharged area encompassed by forming a certain number of said elements on said member will result in the discharge of at least all of the area within a pixel.

22. The apparatus of claim 21 in which the memory means outputs from said store said output beam modulating signals in a sequence such that the modulated and deflected rays, when applied to said electrophotographic member, will produce a pixel upon said member that is an equilateral polygon of more than four sides, there being one pixel formed for each digital word and the pixels being formed in serial groups in the direction of relative movement.

23. The apparatus of claim 22 in which the polygon is a hexagon and the pixels are arranged flat side to flat side in said direction of movement and adjacent pixels are interleaved.

24. The apparatus of claim 23 in which the movement means moves the mounting means for the electrophotographic member and the radiant energy applying means relative to one another in a direction in which the columns are formed within each pixel and each pixel is formed in one pass of said rays across said member, projected through said radiant energy applying means.

25. The apparatus of claim 23 in which the movement means moves the mounting means for the electrophotographic member and the radiant energy applying means relative to one another in a direction in which the columns are formed within each pixel and the rows are transverse of said direction, and the interleaving of adjacent pixels is effected by the output beam modulating signals of the store such that adjacent sequential pixels are offset by half a hexagon so that the apexes of any pixels are aligned with the flats of pixels adjacent thereto.

26. The apparatus of claim 23 in which the output beam modulating signals of said store are such that the circular discharged elements are of a size and placement relative to the pixel and one another so that side by side discharged elements overlap and elements adjacent the boundaries of the pixel overlap into the fields of adjacent pixels.

27. The apparatus of claim 18 in which the output beam modulating signals of the store are such that the rays that are directed onto the electrophotographic member form discharged elements in rows and columns and the discharged elements of alternate rows in each pixel are staggered, the number of discharged elements at the center of the hexagon from apex to apex in a direction transverse to the direction of relative movement being maximum and the number of discharged elements in the rows adjacent the flats being a minimum whereby the number of total columns is substantially greater than the maximum number of discharged elements in any row but the number of rays required to be energized at any time is no more than the maximum number of said discharged elements in the center row.

28. The apparatus of claim 16 in which said means for randomly selecting a single plural pattern is coupled to said input means and is enabled by said input means in accordance with the density and information content of the area at least within and adjacent the pixel to be reproduced.

29. The apparatus of claim 16 in which said means for randomly selecting the single plural pattern is coupled to said store and is modified by said store in accordance with the location of discharged elements in the pixels in the vicinity of the pixel in which said pattern is being formed.

30. Apparatus for imaging an electrophotographic member to enable the member to be made into a printing plate, comprising: an electrophotographic member; a mounting for carrying the member; a charge device for charging the member; a radiant energy applying device arranged for movement relative to said member and applying a composite beam of radiant energy rays in discharging relationship over the surface of the member to scan on said surface a geometric area that is to represent an image, the movement being defined by a plurality of movements repeated in side by side substantially parallel lines defining a certain direction; a drive that effects said relative movement and that includes an encoder for producing sample signals identifying the disposition of the radiant energy applying device and the member at all times; a radiant energy producing device that produces a fine beam of radiant energy; a beam transmitter directing said fine beam to said radiant energy applying device; a beam modulating and deflecting device interposed between said radiant energy producing device and beam transmitter, the beam modulating and deflecting device dividing the fine beam into said composite beam of radiant energy rays and modulating the rays by turning certain ones on and off while said composite beam is being applied over the surface of the member, along one of said parallel lines, to form a consecutive series of microscopic pixels of discrete groupings of charged and discharged elements along said one line, the modulation being effected such that each formed pixel corresponds to an incremental area of said image in which the areal extent of the grouping of charged elements remaining after passage of the beam is substantially proportional to the desired density of said incremental area; a memory device storing plural area-weighted patterns for at least some of the densities of said incremental area; a pattern select device that selects varying ones of the plural patterns to vary placement of the groupings in the pixels and decrease undesirable optical effects by choosing at random any one of said plural area-weighted patterns corresponding to desired density, whereby the composite of all pixels formed on said geometric area forms said image as a latent image made up of said charge groupings; and a toning device that develops said latent image.

31. The apparatus of claim 30 in which said mounting is a rotatable cylinder and the radiant energy applying device includes a carriage movable longitudinally of the cylinder at the periphery thereof to effect a helical movement obtaining said side by side substantially parallel lines.

32. The apparatus of claim 30 in which said patterns produce hexagonal pixels upon said member along said lines and pixels in adjacent lines are interleaved.

33. The apparatus of claim 30 in which the rays of said composite beam have a cross-sectional configuration forming said discharged elements on said member that are generally circular, the rays being applied to said member being spaced from one another so that said discharged elements slightly overlap within the field of each pixel and the number of possible elements and their placement being such that when all elements forming a pixel are discharged there will be no charged areas remaining in said pixel.

34. The apparatus of claim 33 in which the rays are spaced from one another so that when all elements forming a pixel are discharged the discharged elements at the periphery of said pixel overlap into adjacent pixels.

35. The apparatus of claim 32 in which the rays are aligned spaced from one another generally perpendicular to said lines, are capable of discharging generally circular elements of area on discharge centers across each pixel and along the certain direction of the line of formation of the pixels, the spacing of the discharge centers in any pixel being arranged in columns along the direction of movement and rows transversely thereof, the discharge centers of a single pixel along any row occurring in alternate columns and along columns occurring in a manner to result in alternate rows where more than one center occurs in a column of said single pixel, whereby the discharge centers in any pixel form a hexagonal arrangement similar to and within the said pixel hexagon.

36. The apparatus of claim 35 in which the circular discharge elements are of a diameter such as slightly to overlap and fully discharge the field of a pixel when all discharge elements within said pixel field are discharged.

37. The apparatus of claim 33 in which the discharge elements are formed at discharge centers on said member, said discharge centers being arrange in a hexagon within the pixel and with its sides parallel to adjacent sides of the pixel hexagon.

38. The apparatus of claim 37 in which there are nineteen discharge centers arranged in five rows, there being three of said centers in each of the top and bottom rows, five of the centers in the center row and four of the centers in each of the remaining rows.

39. The apparatus of claim 37 in which the charged and discharged elements for any pixel which is neither fully charged nor fully discharged will form said grouping of charged elements within the pixel field as an irregular display whose area corresponds to a particular density and in which the groupings in the pixels within the vicinity of one another are varied as to placement within the respective pixels to decrease undesirable optical effects such as moire patterns in the developed image.

40. The apparatus of claim 39 in which the groupings are distributed in different locations within the pixels substantially randomly.

41. Electrophotographic imaging apparatus including an electrophotographic member having a chargeable photoconductive outer surface capable of being discharged by a composite beam of radiant energy, said apparatus comprising a source of a composite beam of radiant energy rays, means for charging the photoconductive surface of the electrophotographic member, means for scanning said charged surface with the composite beam of radiant energy rays over said electrophotographic member, said scanning means operable to effect a plurality of movements repeated in side-by-side substantially parallel lines defining a certain direction, means for modulating the rays by turning certain ones on and off, means for moving the beam along one of said parallel lines during modulation of the rays to form a consecutive series of microscopic pixels of discrete groupings of charged and discharged elements along said one line, whereby each formed pixel corresponds to an incremental area of an image in which the areal extent of the grouping of charged elements remaining after the beam passes is substantially proportional to the desired density of said incremental area providing plural area-weighted patterns for at least some of the densities of said incremental areas, means selecting at random any one of the plural area-weighted patterns corresponding to the desired density, to vary the placement of the groupings in the pixels to decrease undesirable optical effects and means for developing the resulting latent charge image thereby formed.

* * * * *

UNITED STATES PATENT AND TRADEMARK OFFICE
CERTIFICATE OF CORRECTION

PATENT NO. : 4,566,042

DATED : January 21, 1986

INVENTOR(S) : Lysle D. Cahill

It is certified that error appears in the above-identified patent and that said Letters Patent are hereby corrected as shown below:

Column 1, line 13, "4,467,707" should be --4,468,707--;

Column 2, line 19, after "visual" --gradients of different density-- should be inserted;

Column 4, line 49, after "elements" there should be a --,--;

Column 5, line 12, "changes" should be --chances--;

Column 10, line 36, "is" should be deleted;

Column 11, line 2, "indidated" should be --indicated--;

Column 12, lines 15 & 16, "centering points" should be --discharge elements--;

Column 12, line 17, "discharge elements" should be --centering points--;

Column 13, line 41, after "lines" --from comparator 111-- should be inserted;

Column 13, line 9, after "area" --of-- should be inserted;

Column 13, line 42, "AOn" should be --A0n--;

UNITED STATES PATENT AND TRADEMARK OFFICE
CERTIFICATE OF CORRECTION

PATENT NO. : 4,566,042

DATED : January 21, 1986

INVENTOR(S) : Lysle D. Cahill

It is certified that error appears in the above-identified patent and that said Letters Patent is hereby corrected as shown below:

Column 13, lines 42 and 43, delete "from comparator 111".

Signed and Sealed this

Twenty-seventh Day of May 1986

[SEAL]

Attest:

DONALD J. QUIGG

Attesting Officer

Commissioner of Patents and Trademarks